(12) United States Patent
Kim et al.

(10) Patent No.: US 10,427,713 B2
(45) Date of Patent: Oct. 1, 2019

(54) STEERING APPARATUS FOR VEHICLE (71) Applicant: MANDO CORPORATION, Gyeonggi-do (KR)

(72) Inventors: Dong Wan Kim, Gyeonggi-do (KR); Hong Yong Bhae, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 122 days.

(21) Appl. No.: 15/791,324

(22) Filed: Oct. 23, 2017

(65) Prior Publication Data
US 2018/0111643 A1    Apr. 26, 2018

(30) Foreign Application Priority Data

Oct. 25, 2016   (KR) .................. 10-2016-0139115

(51) Int. Cl.
*B62D 5/30* (2006.01)
*B62D 5/04* (2006.01)
*B62D 5/09* (2006.01)
*B62D 6/00* (2006.01)
*B62D 15/02* (2006.01)
*B62D 5/06* (2006.01)
*B60W 20/00* (2016.01)

(52) U.S. Cl.
CPC .............. *B62D 5/30* (2013.01); *B60W 20/00* (2013.01); *B62D 5/04* (2013.01); *B62D 5/0409* (2013.01); *B62D 5/0412* (2013.01); *B62D 5/0463* (2013.01); *B62D 5/06* (2013.01); *B62D 5/091* (2013.01); *B62D 6/00* (2013.01); *B62D 15/025* (2013.01); *B60W 2510/202* (2013.01); *B60W 2520/10* (2013.01); *B60W 2550/30* (2013.01)

(58) Field of Classification Search
CPC .......... B62D 5/30; B62D 5/04; B62D 5/0409; B62D 5/0412; B62D 5/0463; B62D 5/06; B62D 5/091; B62D 6/00
See application file for complete search history.

(56) References Cited

U.S. PATENT DOCUMENTS 6,612,393 B2 * 9/2003 Bohner .................. B62D 5/003
                                                        180/402
7,530,422 B2 * 5/2009 Bolourchi .............. B62D 5/008
                                                        180/406

(Continued)

*Primary Examiner* — Kevin Hurley
(74) *Attorney, Agent, or Firm* — Ladas & Parry, LLP (57) ABSTRACT

A steering apparatus for a vehicle according to the present disclosure includes: a controller configured to transmit steering control signals on the basis of a first input signal from a torque sensor configured to sense torque of a steering shaft and a second input signal from any one of a location sensor, a camera sensor, a distance sensor, a vehicle speed sensor, and a vehicle height sensor; a first steering power assist configured to generate steering force by rotating the steering shaft or supplement steering force of the steering shaft rotating forward or backward, using electric power in response to the steering control signal from the controller; and a second steering power assist configured to switch channels for working fluid, depending on forward or backward rotation of the steering shaft, and steer wheels by operating a tie rod or a knuckle using hydraulic pressure of the working fluid.

19 Claims, 10 Drawing Sheets

(56) References Cited

U.S. PATENT DOCUMENTS

| | | | | |
|---|---|---|---|---|
| 8,162,095 B2* | 4/2012 | Bootz | ............... | B60R 25/021 |
| | | | | 180/403 |
| 9,022,167 B2* | 5/2015 | Park | ............... | B62D 5/065 |
| | | | | 180/405 |
| 9,469,340 B2* | 10/2016 | Morselli | ............... | B62D 1/22 |
| 2010/0152971 A1* | 6/2010 | Shiino | ............... | B62D 5/0463 |
| | | | | 701/41 |

* cited by examiner

*RELATED ART*

STEERING APPARATUS FOR VEHICLE

CROSS REFERENCE TO RELATED APPLICATION

This application claims priority from Korean Patent Application No. 10-2016-0139115, filed on Oct. 25, 2016, which is hereby incorporated by reference for all purposes as if fully set forth herein.

BACKGROUND OF THE INVENTION

1. Field of the Invention

The present disclosure relates to a steering apparatus for a vehicle and, more particularly, to a steering apparatus for a vehicle, the steering apparatus improving convenience for a driver because it includes an electric steering power assist rotating an input shaft of a hydraulic steering power assist even though a driver does not directly steer so that additional functions of controlling a vehicle regardless of driver's steering intention, such as automatic parking, lane keeping, trailer backup assistance, driving assistance based on road surface condition, steering vibration attenuation, and self-driving control can be used even in a truck or a bus requiring relatively large steering force in comparison to a car.

2. Description of the Prior Art

According to steering apparatuses in the related art, a hydraulic steering power assist having large power has been used in trucks or buses requiring relatively large steering force in comparison to cars because it was difficult to expect desired power from an electric steering power assist. However, such hydraulic steering power assist does not have a controller, so functions using a controller such as automatic parking, lane keeping, and future automatic driving cannot be used.

SUMMARY OF THE INVENTION

The present disclosure has been made in an effort to solve the problems and an object of the present disclosure is to provide a steering apparatus for a vehicle, the steering apparatus improving convenience for a driver because it includes an electric steering power assist rotating an input shaft of a hydraulic steering power assist even though a driver does not directly steer so that additional functions of controlling a vehicle regardless of driver's steering intention, such as automatic parking, lane keeping, trailer backup assistance, driving assistance based on road surface condition, steering vibration attenuation, and self-driving control can be used even in a truck or a bus requiring relatively large steering force in comparison to a car.

Another object of the present disclosure is to provide a steering apparatus for a vehicle, the steering apparatus increasing safety for a driver by controlling a vehicle regardless of driver's steering intention, and supplementing or generating steering force in reflection of driver's steering intention when the driver turns a steering wheel, using a torsion bar in an electric steering power assist and a torque sensor that senses the driver's steering intention.

The objects of the present disclosure are not limited thereto and other objects not stated herein will be clearly understood by those skilled in the art from the following description.

A steering apparatus for a vehicle according to an aspect of the present disclosure includes: a controller configured to transmit steering control signals on the basis of a first input signal from a torque sensor configured to sense torque of a steering shaft and a second input signal from any one of a location sensor, a camera sensor, a distance sensor, a vehicle speed sensor, and a vehicle height sensor; a first steering power assist configured to generate steering force by rotating the steering shaft or supplement steering force of the steering shaft rotating forward or backward, using electric power in response to the steering control signal from the controller; and a second steering power assist configured to switch channels for working fluid, depending on forward or backward rotation of the steering shaft, and steer wheels by operating a tie rod or a knuckle using hydraulic pressure of the working fluid.

According to the present disclosure, since the steering apparatus includes an electric steering power assist rotating an input shaft of a hydraulic steering power assist even though a driver does not directly steer, additional functions of controlling a vehicle regardless of driver's intention to steer, such as automatic parking, lane keeping, trailer backup assistance, driving assistance based on road surface condition, steering vibration attenuation, and self-driving control, can be used even in a truck or a bus requiring relatively large steering force in comparison to a car. Accordingly, it is possible to improve convenience for a driver.

Further, according to the present disclosure, it is possible to increase safety for a driver by controlling a vehicle regardless of driver's steering intention, and supplementing or generating steering force in reflection of driver's steering intention when the driver turns a steering wheel, using a torsion bar in an electric steering power assist and a torque sensor that senses the driver's intention.

DETAILED DESCRIPTION OF THE EXEMPLARY EMBODIMENTS

Hereinafter, embodiments of the present disclosure will be described in detail with reference to the accompanying drawings. In adding reference numerals to elements in each drawing, it should be noted that the same elements are designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

In general, a steering apparatus for a vehicle, which is an apparatus for allowing a driver to steer a vehicle in desired directions, freely changes the center of turning of the front wheels of a vehicle so that the vehicle can be driven in driver's desired directions.

Meanwhile, a power steering apparatus is an apparatus that allows a driver to easily change the direction of a vehicle with smaller force by supplementing the force that a driver applies to operate a steering wheel, using a boosting device when the driver operates the steering wheel in a vehicle.

Such power steering apparatuses are classified in a broad sense into an electronic power steering apparatus (EPS) and a hydraulic power steering apparatus (HPS).

According to the hydraulic power steering apparatus, when a hydraulic pump connected to the rotary shaft of an engine supplies working fluid to a working cylinder connected to a rack bar, a piston in the working cylinder receiving the working fluid moves and supplements steering force, thereby allowing a driver to steer with small force.

Meanwhile, the electric power steering apparatus includes a motor instead of the hydraulic pump and the working cylinder and supplements steering force of a steering wheel using force from the motor.

Figure 1:
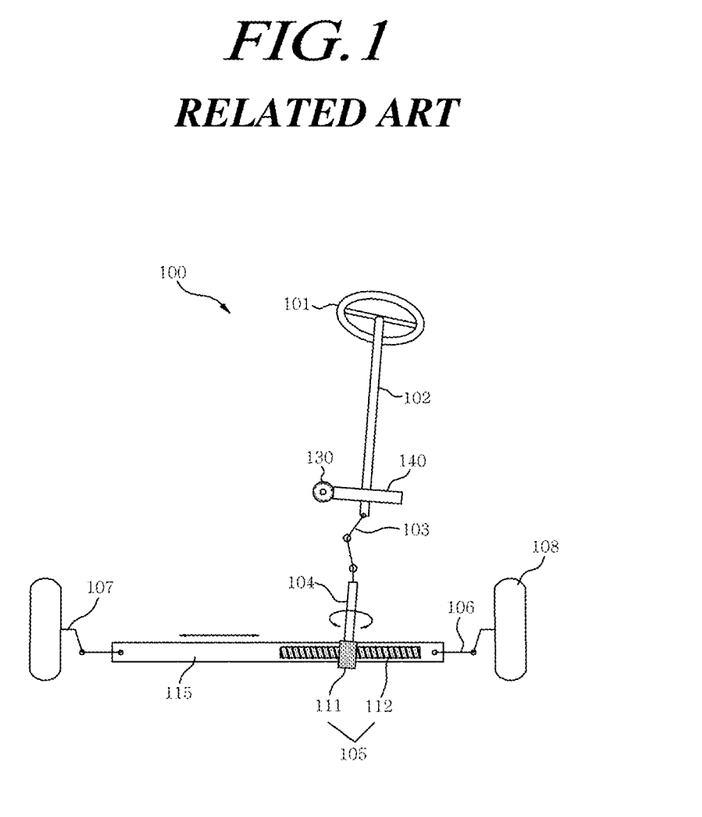
FIG. 1 is a view showing an electric power steering apparatus of steering apparatuses for a vehicle.

FIG. 1 is a schematic view of an electric power steering apparatus.

As shown in FIG. 1, an electric power steering apparatus includes a steering system 100 from a steering wheel 101 and wheels 108 at both sides of a vehicle and an assistant power assembly that provides steering assist power to the steering system 100.

The steering system 100 includes a steering shaft 102 connected to the steering wheel at an end to rotate with the steering wheel 101 and connected to a pinion shaft 104 at the other end through a pair of universal joints 103. Further, the pinion shaft 104 is connected to a rack bar through a rack and pinion 105 and both ends of the rack bar are connected to the wheels 108 through a tie rod 106 and a knuckle arm 107. The rack and pinion 105 are formed by engaging a pinion gear 111 fitted on the pinion shaft 104 and a rack gear 112 formed on a portion of the outer side of a rack bar. Accordingly, when a driver operates the steering wheel 101, torque is generated in the steering system 100 and the wheels 108 are steered through the rack and pinion 105 and the tie rod 106 by the torque.

The assistant power assembly includes a motor 130 that generates assistant power and a reducer 140 that transmits the assistant power generated by the motor 130 to the steering shaft 102.

Figure 2:
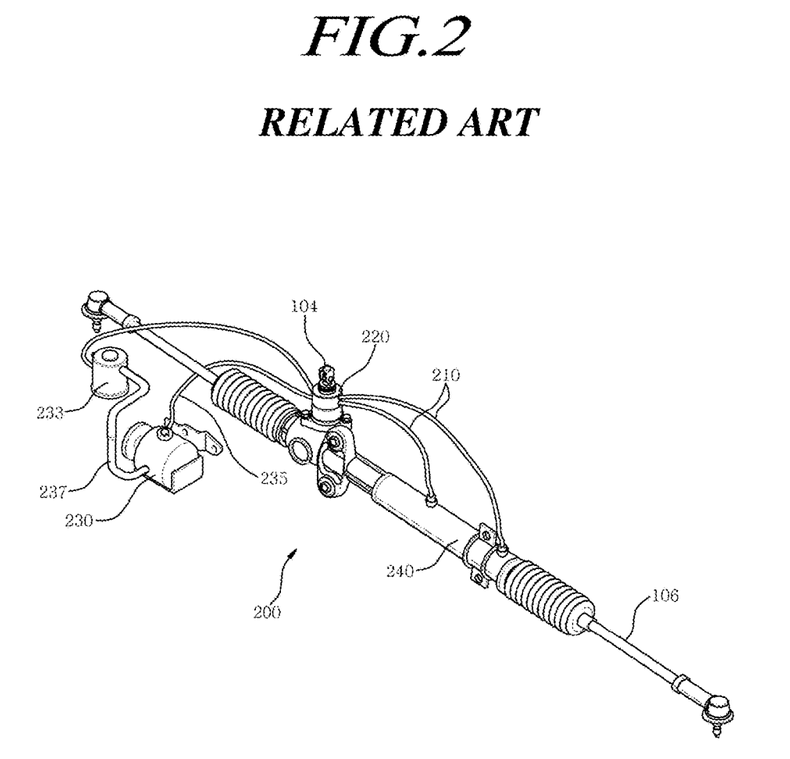
FIG. 2 is a view showing a hydraulic power steering apparatus of steering apparatuses for a vehicle.

FIG. 2 is a partial cross-sectional vie showing a hydraulic power steering apparatus.

As shown in FIG. 2, a hydraulic power steering apparatus 200 includes: a pinion valve assembly 220 that is disposed at the lower end of a steering shaft having a steering wheel 101 (see FIG. 1) thereon to control the flow direction of a working fluid in steering; and a working cylinder 240 that applies force to a tie rod 106 that steers wheels that are supposed to be steered when the pinion valve assembly 220 is operated.

According to the hydraulic system of the hydraulic power steering apparatus, working fluid supplied from a hydraulic pump 230 is supplied to the pinion valve assembly 220 through a pressure hose 235, and when the working fluid is selectively supplied to left and right pressure chambers of the working cylinder 240, depending on the rotational direction of the steering wheel that is turned to steer, a rack bar is slid left or right by hydraulic pressure and supplements the steering force. Further, the working fluid that finishes work in the pinion valve assembly 220 returns to an oil tank 233 and is then supplied back to the hydraulic pump 230 through an intake hose 237.

Figure 3:
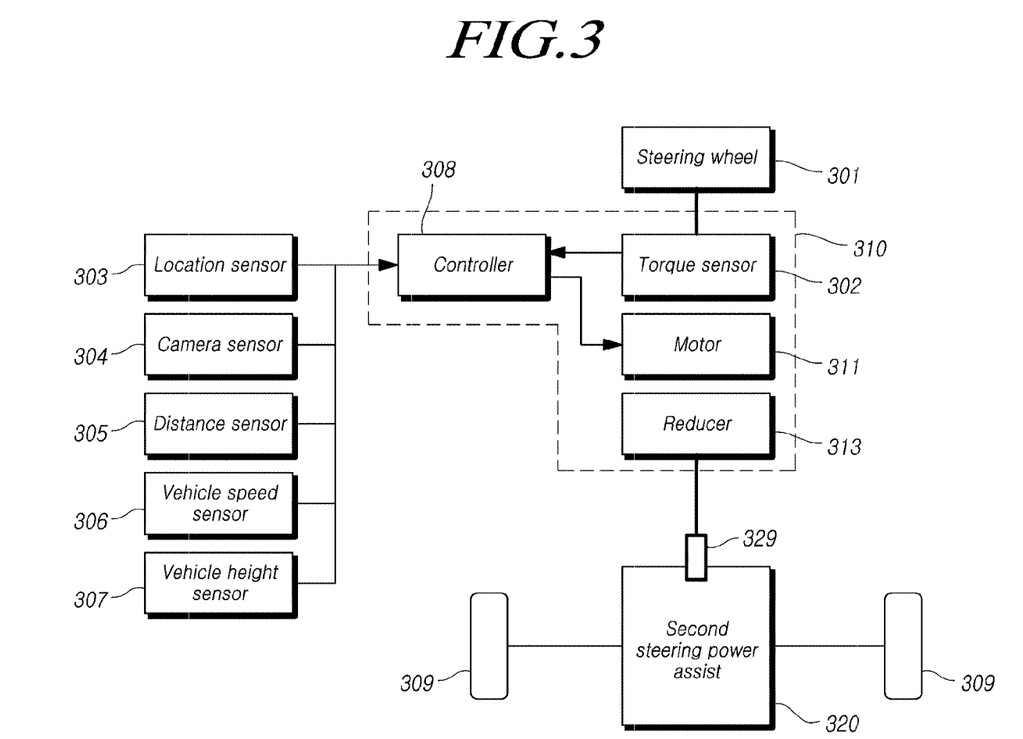
FIG. 3 is a view showing the configuration of a steering apparatus for a vehicle according to the present disclosure.
Figure 4:
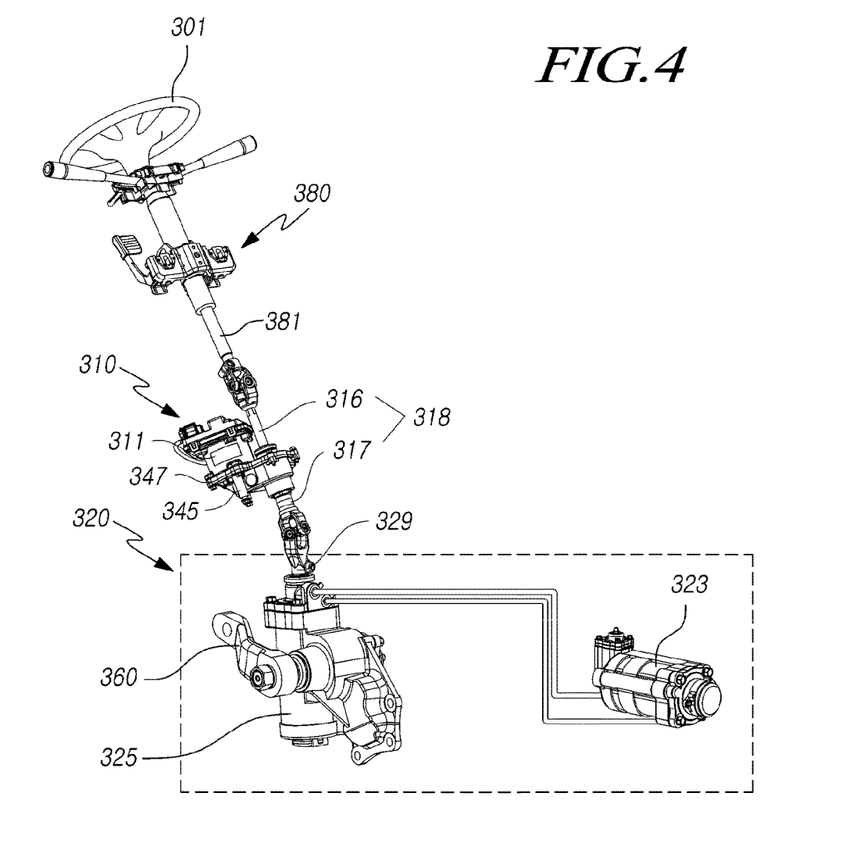
FIG. 4 is a perspective view schematically showing a steering apparatus for a vehicle according to the present disclosure.
Figure 5:
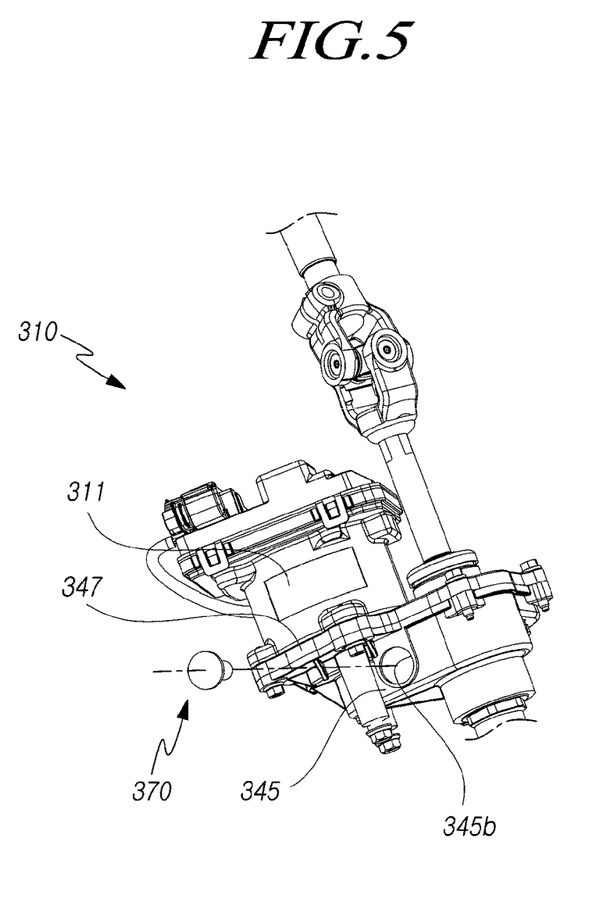
FIG. 5 is a perspective view showing a first steering power assist shown in FIG. 4.
Figure 6:
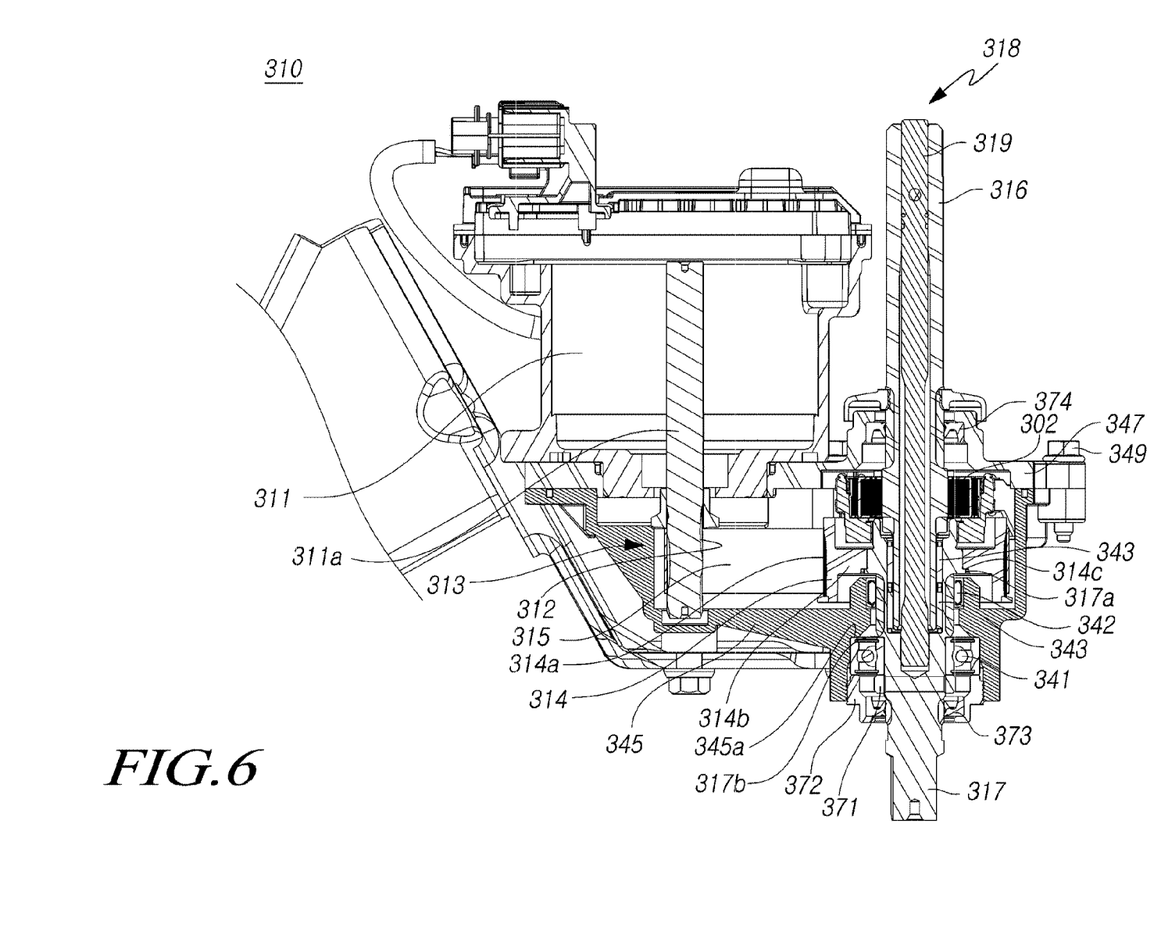
FIG. 6 is a cross-sectional view showing the first steering power assist shown in FIG. 4.
Figure 7:
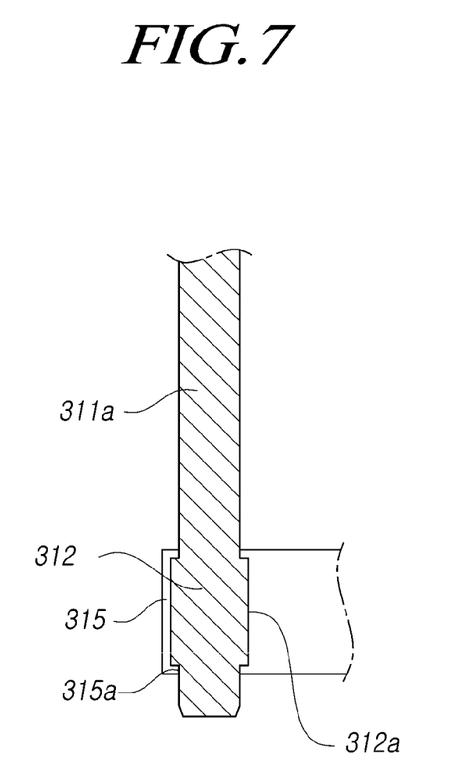
FIG. 7 is a cross-sectional view showing a portion of the first steering power assist shown in FIG. 6.
Figure 8:
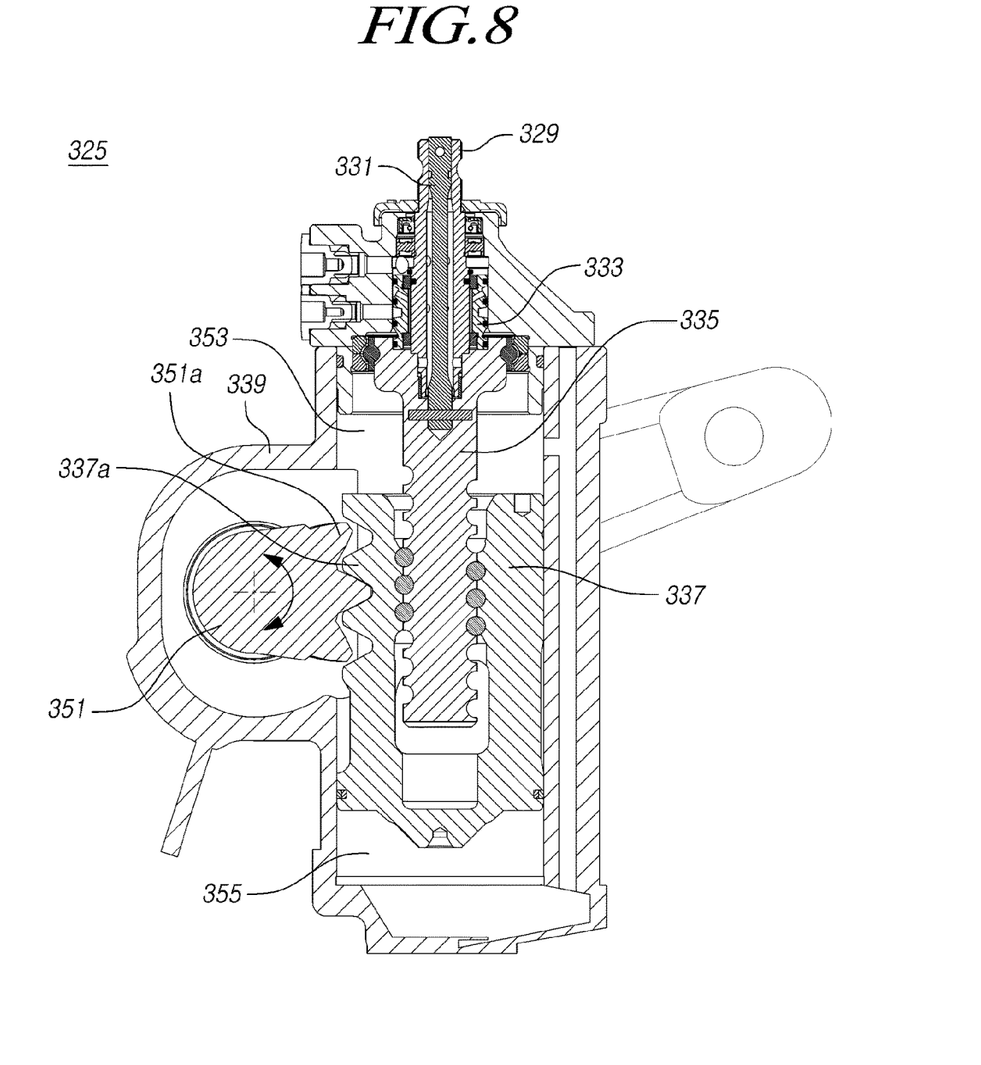
FIG. 8 is a cross-sectional view showing another embodiment of a first steering power assist.
Figure 9:
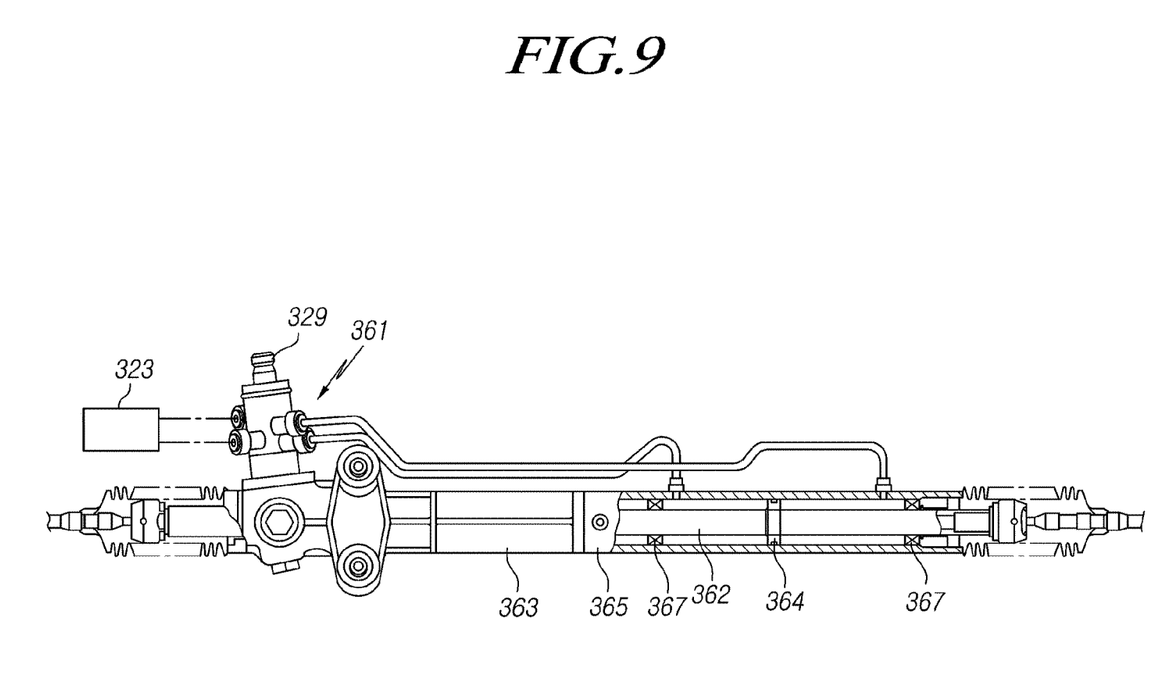
FIG. 9 is a cross-sectional view showing a gearbox shown in FIG. 4.
Figure 10:
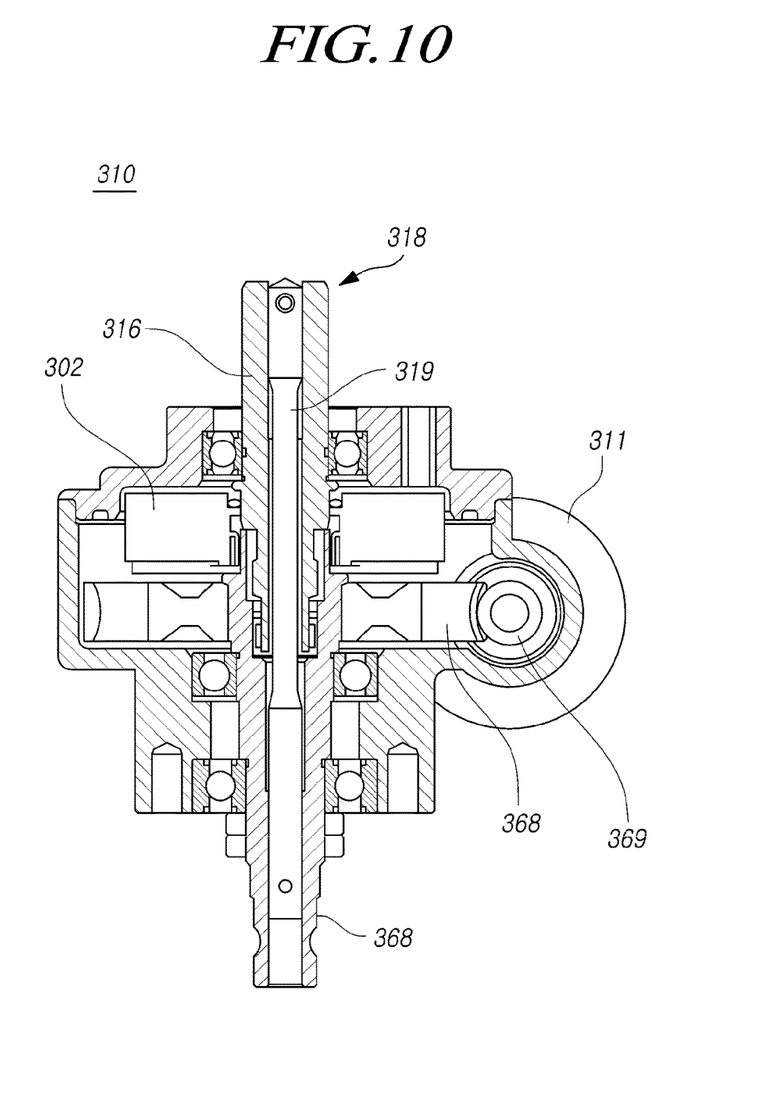
FIG. 10 is a cross-sectional view showing another embodiment of a second steering power assist.

FIG. 3 is a view showing the configuration of a steering apparatus for a vehicle according to the present disclosure, FIG. 4 is a perspective view schematically showing a steering apparatus for a vehicle according to the present disclosure, FIG. 5 is a perspective view showing a first steering power assist shown in FIG. 4, FIG. 6 is a cross-sectional view showing the first steering power assist shown in FIG. 4, FIG. 7 is a cross-sectional view showing a portion of the first steering power assist shown in FIG. 6, FIG. 8 is a cross-sectional view showing another embodiment of a first steering power assist, FIG. 9 is a cross-sectional view showing a gearbox shown in FIG. 4, and FIG. 10 is a cross-sectional view showing another embodiment of a second steering power assist.

As show in these figures, a steering apparatus for a vehicle according to the present disclosure includes: a controller 308 that transmits steering control signals on the basis of a first input signal from a torque sensor 302 that senses torque of a steering shaft 381 and a second input signal from any one of a location sensor 303, a camera sensor 304, a distance sensor 305, a vehicle speed sensor 306, and a vehicle height sensor 307; a first steering power assist 310 that generates steering force by rotating the steering shaft 381 using electric power or supplements steering force of the steering shaft 381 rotating forward or backward, using electric power in response to the steering control signal from the controller 308; and a second steering power assist 320 that switches channels for working fluid, depending on forward or backward rotation of the steering shaft 381, and steers wheels 309 by operating a tie rod or a knuckle using the hydraulic pressure of the working fluid.

A first input signal from the torque sensor 302 and a second input signal from any one of the location sensor 303, the camera sensor 304, the distance sensor 305, the vehicle speed sensor 306, and the vehicle height sensor 307 are input to the controller 308.

That is, when a driver operates the steering wheel 301 and the torque sensor 302 that senses a rotational direction and torque of the steering shaft 381 supposed to rotate with the steering wheel 301 senses which direction of the left and right the driver has turned the steering wheel in and the torque applied to the steering wheel 301, the torque sensor 302 transmits a first input signal reflecting the driver's steering intention to the controller 308.

Further, in a vehicle, when the location sensor 303 senses the location of the vehicle, the camera sensor 304 senses the current lane of the vehicle or the surrounding situations, the distance sensor 305 senses whether there is an obstacle or a person around the vehicle, the vehicle speed sensor 306 senses the speed of the vehicle, or the vehicle speed sensor 307 checks a road surface state by sensing the height of the vehicle from the road surface, the sensors transmit a second input signal to the controller 308.

The first steering power assist 310 is an electric steering power assist using a driving force from a motor 311, in which the motor can be driven when the steering shaft 381 connected to the steering wheel is turned and the torque sensor inputs a first input signal to the controller or when any one of the location sensor 303, the camera sensor 304, the distance sensor 305, the vehicle speed sensor 306, and the vehicle height sensor 307 inputs a second input signal to the controller 308, whereby the motor can be operated.

The second steering power assist 320 is a hydraulic steering power assist having channels that are switched in accordance with the rotational direction an input shaft 329, in which since the channel is changed in accordance with the rotational direction of the input shaft 329, working fluid is adjusted in pressure while flowing into a first cylinder 353 or a second cylinder 355 and rotates a sector shaft 351 or while flowing into both hydraulic pipes diverging to a piston 364 of a rack bar 362 and slides the rack bar 362, thereby steering the wheels 309.

In this configuration, when the driver does not turn the steering wheel 301, an input shaft 329 connected to the steering wheel 381 is not rotated, so the second steering power assist 320 cannot be operated. Accordingly, the first steering power assist 310 is provided to operate the second steering power assist 320 regardless of driver's steering intention.

The first steering power assist 310 can operate in response to a steering control signal from the controller 308 regardless of driver's steering intention, and when a second input signal is input to the controller 308, the first steering power assist 310 and the second steering power assist 320 can be operated regardless of driver's steering intention.

The first steering power assist 310 may be operated to perform additional functions and can be operated in response to a second input signal from the location sensor 303, the camera sensor 304, the distance sensor 305, the vehicle speed sensor 306, and the vehicle height sensor 307.

Further, when the controller 308 transmits a steering input signal to the motor 311 in response to a second input signal, the first steering power assist 310 is operated, and in this state, when a first input signal is input to the controller 308, that is, driver's steering intention is input, the controller transmits a steering control signal reflecting priority of the driver's steering intention to steer to the motor 311 and the first steering power assist 310 is operated to follow the driver's steering intention.

The location sensor 303, the camera sensor 304, the distance sensor 305, the vehicle speed sensor 306, and the vehicle height sensor 307 that transmit such second input signal are described in more detail. The location sensor 303 senses the location of a vehicle, for example, using GPS information, receives the characteristics of a driving road or the driving route of a vehicle, and transmits the characteristics or the driving route to the controller 308.

The camera sensor 304 scans the surroundings of a vehicle, performs lane recognition etc. on the basis of image data obtained by the scanning, and transmits the result to the controller 308 so that the vehicle can keep running in the current lane or can be automatically parked.

The distance sensor 305, for example, which may be a radar or an ultrasonic sensor, senses whether there is an obstacle or a person around the vehicle by emitting a radar beam or an ultrasonic beam and then recognizing the return time or position of the reflecting beam, and then transmits the sensing result to the controller 308.

The vehicle speed sensor 306 detects the speed of a vehicle and transmits the speed to the controller 308 and the vehicle height sensor 307 senses the distance from the position of the vehicle to a road surface and then transmits the distance to the controller 308.

When the controller 308 generates a steering control signal on the basis of the first input signals and transmits the first input signals to the motor 311 of the first steering power assist 310, the first steering power assist 310 supplements steering force in the direction in which the steering wheel 310 is operated by a driver. Further, when the controller 308 generates a steering control signal reflecting priority of driver's steering intention and transmits the steering control signal to the motor 311 of the first steering power assist 310, the first steering power assist 310 generates force for operating the steering wheel 301 to control the vehicle regardless of the driver's steering intention.

The steering control signals based on the second input signals may include instructions to perform functions for assisting a driver using any one or, two or more of the location sensor 303, the camera sensor 304, the distance sensor 305, the vehicle speed sensor 306, and the vehicle height sensor 307, that is, additional functions such as automatic parking, lane keeping, trailer backup assistance, driving assistance based on road surface condition, steering vibration attenuation, and self-driving control.

As for the additional functions, automatic parking is a function that parks a vehicle in a parking area without operation from a driver, the lane keeping is a function that keeps a lane by recognizing the lane even without steering by a driver, and the driving assistance based on road surface condition is a function that prevents a vehicle from inclining in any one direction even if a road surface is inclined or transversely curved.

Further, trailer backup assistance is a function that allows a driver not to directly steer a vehicle by turning the steering wheel 301 to transmit torque through the steering shaft 381, but to steer a vehicle using and assist (for example, a specific jog dial, a button, or a controller).

In other words, when the assist is a specific jog dial and the jog dial is turned right, a second input signal that has steering information for steering the vehicle to the right is input to the controller 308, the controller 308 transmits a steering control signal corresponding to the steering information for steering the vehicle to the right to the motor 311, the first steering power assist 310 rotates the steering shaft 381, and steering force is transmitted to the input shaft 329 of the second steering power assist 320 connected to the steering wheel 381, whereby the vehicle is steered with operation of the second steering power assist 320.

Further, steering vibration attenuation, which is a function that attenuates vibration from a road surface, prevents vibration from being transmitted to the steering wheel 301 from a road surface through the steering shaft 381 by sensing the frequency of the vibration from the road surface and generating an offset frequency.

In accordance with the additional functions, the controller 308 transmits steering control signals based on the second input signals to the motor 311 to make the first steering power assist 310 generate steering force and the input shaft 329 of the second steering power assist 320 is rotated by the steering force, whereby the second steering power assist 320 steers the vehicle.

The first steering power assist 310 is supposed to supplement steering force in reflection of driver's steering intention by rotating the steering shaft 381 in the same direction as the steering wheel 301 turned by a driver, or to generate steering force regardless of driver's steering intention in response to a steering control signal from the controller 308.

When the first steering power assist 310 reflecting the driver's steering intention is reflected, a steering control signal is transmitted to the motor 311 in response to a first input signal from the torque sensor 302 and the motor 311 is operated and rotates the steering shaft 381 in the steering direction by the driver, thereby supplementing the steering force applied by the driver.

Further, when the first steering power assist 310 generates steering force regardless of driver's steering intention, a steering control signal is transmitted to the motor 311 in response to a second input signal from any one of the location sensor 303, the camera sensor 304, the distance sensor 305, the vehicle speed sensor 306, and the vehicle height sensor 307 and the motor 311 is operated and rotates the steering shaft 381, thereby generating steering force.

Further, when the first input signal is input to the controller 308 while the first steering power assist 310 and the second steering power assist 320 are operated regardless of driver's steering intention, the controller 308 transmits a steering control signal reflecting priority of driver's steering intention to the motor 311.

In other words, when a driver turns the steering wheel and a first input signal is input while the second steering power assist 320 is operated by steering force generated by the first steering power assist 310 regardless of driver's steering intention, the controller 308 transmits a steering control signal reflecting priority of the driver's steering intention to the motor 311, so the first steering power assist 310 and the second steering power assist 320 supplement the steering force applied by the driver.

The first steering power assist 310, which is an electric steering power assist using a driving force from the motor 311, generates steering force by rotating the steering shaft 381 or supplements steering force of the steering shaft 381 rotating forward or backward, using electric power in response to a steering control signal from the controller 308.

The first steering power assist 310 is disposed on an intermediate shaft 318 positioned between a column 380 of the steering shaft 381 and the second steering power assist 320 and provides steering force to the second steering power assist 320.

The intermediate shaft 318 is composed of a steering input shaft 316 connected to the column 380 and a steering output shaft 317 connected to the second steering power assist 320, in which the steering input shaft 316 and the steering output shaft 317 are connected to each other through a torsion bar 319, and the torque sensor 302 is disposed on the steering input shaft 316 and the steering output shaft 317 and senses and transmits torque of the steering input shaft 316 and the steering output shaft 317 to the controller 308.

As described above, since the steering input shaft 316 and the steering output shaft 317 of the first steering power assist 310 are coupled through the torsion bar 319 and there is provided the torque sensor 302, when a driver turns the steering wheel 301 while the vehicle is controlled regardless of driver's steering intention, the torque sensor 302 senses the driver's steering intention and steering force is supplemented or generated in reflection of the driver's steering intention, thereby increasing safety for the driver.

Referring to FIG. 6, for example, the first steering power assist 310 includes: a reducer 313 that includes a driven pulley 314 rotatably connected to the steering wheel 317, a belt 315 connected to the driven pulley 314, and a driving pulley 312 connected to the belt 315 to rotate the driven pulley 314; and a motor 311 that operates the driving pulley 312 forward or backward in response to steering control signals from the controller 308.

In order that the first steering power assist 310 provides steering force to the intermediate shaft 318 using the driving force from the motor 311, the reducer 313 that controls the number of revolutions of the motor 311 for appropriate rotation of the steering shaft 381 is mounted on the steering shaft 381.

The reducer 313 is largely composed of the driving pulley 312 fitted on a motor shaft 311a, the driven pulley 314 fitted on the steering output shaft 317, and the belt 315 connecting the driving pulley 312 and the driven pulley 314 to each other, in which the driven pulley 314 and the steering output shaft 317 connected through the belt 315 are operated by the driving force from the motor 311 and rotate the intermediate shaft 318 while reducing the speed in accordance with a gear ratio.

The steering output shaft 317 is fitted through the center of the driven pulley 314 to rotate together and the driving pulley 312 connected to the driven pulley 314 through the belt 315 is rotated by the driving force from the motor 311 and rotates the driven pulley 314 and the steering output shaft 317, thereby supplementing or generating steering force.

The motor 311 rotates the driven pulley 314 and the steering output shaft 317 forward or backward by rotating the driving pulley 312 in response to a steering control signal from the controller 308, thereby supplementing steering force applied to the steering wheel 301 by a driver or rotating the input shaft 329 instead of steering force that is applied to the steering wheel 301 by a driver and operating the second steering power assist 320.

The driving pulley 312 has a gear on the outer side to be engaged with the belt 315, and it may be a hollow body to be forcibly fitted on the motor shaft 311a or may be integrally formed on the end of the motor shaft 311a.

For example, as shown in FIG. 7, when the driving pulley 312 is integrally formed with the motor shaft 311a, a pulley gear 312a that is engaged with the belt 315 is formed on the outer side of the driving pulley 312 formed on the motor shaft 311a, so the belt 315 is engaged with the pulley gear 312a of the motor shaft 311a.

Further, locking projections 315a supporting and preventing separation of both ends of the driving pulley 312 are formed at both ends on the inner side of the belt 315, so it is possible to prevent separation of the belt 315 even though the motor 311 rotates forward and backward.

Further, the driven pulley 314 has a pulley gear 314a on the outer side to be engaged with the belt 315 and the steering output shaft 317 is forcibly fitted in the driven pulley 314.

Further, the driven pulley 314 has a coupling portion 314b projecting radially inward to be coupled to the steering output shaft 317, so it is possible to both couple the driven pulley 314 to the steering output shaft 317 and give a large diameter to the pulley gear 314a. Further, the reduction gear ratio of the driving pulley 312 and the driven pulley 314 is increased, so the steering output shaft 317 outputs large torque.

That is, in order to make the driven pulley 314 larger in diameter than the driving pulley 312 and achieve a desired gear ratio, the radially projecting coupling portion 314b is formed on the inner side of the driven pulley 314.

Further, a locking projection 317a is formed at a side on the outer side of the steering output shaft 317 and an insertion groove 314c is formed at a side on the inner side of the coupling portion 314b, so the locking portion 317a is inserted in the insertion groove 314c.

That is, the locking projection 317a is formed at the steering output shaft 317 and the insertion groove 314c is formed at the driven pulley 314, and the locking projection 317a is inserted in the insertion groove 314c, so the driven pulley 314 is coupled to the steering output shaft 317 and rotates the steering output shaft 317.

The steering output shaft 317 and the driven pulley 314 can be, for example, forcibly fitted to each other and then the locking projection 317a is inserted in the insertion groove 314c, so the steering output shaft 317 and the driven pulley 314 can be stably combined.

Alternatively, the steering output shaft 317 and the driven pulley 314 may be integrally formed, in which the coupling portion 314 may protrude radially outward on a side of the steering output shaft 317 and the pulley gear 314a may be formed at the projective end of the coupling portion 314b to be engaged with the belt 315.

A belt housing 345 covering the belt 315, the steering output shaft 317, and the torque sensor 302 may be further provided. The belt housing 345 receives the belt 315, the steering output shaft 317, and the torque sensor 302 therein and is combined with the steering output shaft 317 through a first bearing 341 and a second bearing 342.

The belt housing 345 covers and protects the belt 315, the steering output shaft 317, and the torque sensor 302 from the outside and prevents dust from entering inside.

The belt housing 345 may have a hole 345b at the position corresponding to the belt 315 to be able to measure tension of the belt 315 when the apparatus is assembled or after the apparatus is used for a predetermined time, and the hole 345b may be covered with a detachable plug 370 after the tension is measured.

The first bearing 341 is, for example, a ball bearing, and resists axial and radial load of the steering output shaft 317.

The inner race of the first bearing 341 is supported at a first side by a first projection 317b radially protruding outward from the steering output shaft 317 and supported at a second side by a lock nut 371 thread-fastened to the steering output shaft 317.

The outer race of the first bearing 341 is supported at a first side by a second projection 345a radially protruding inward from the belt housing 345 and supported at a second side by a lock screw 372 thread-fastened to an open end of the belt housing 345.

The lock screw 372 is thread-fastened in the belt housing 345 and supports the first side of the outer race of the first bearing 341 and has a first sealing 373 forcible fitted in a second side thereof, thereby preventing dust or water from entering into the belt housing 345.

The first sealing 373 is disposed between the inner side of the second side of the lock screw 372 and the steering output shaft 317, thereby preventing dust or water from entering into the belt housing 345.

The second bearing 342 is, for example, a needle bearing, and resists radial load of the steering output shaft 317, so the steering output shaft 317 is stable retained in the belt housing 345.

A cover housing 347 to which the motor 311 is coupled may be further disposed on a side of the belt housing 345 and is coupled to the belt housing 345 by fasteners 349.

Since the cover housing 347 is provided, the motor 311 can be coupled to the belt housing 345 and the opening of the belt housing 345 through which the steering output shaft 316 is coupled is hermetically closed.

The cover housing 347 has a second sealing 374 on the side opposite to the belt housing 345, thereby preventing dust or water from entering into the cover housing 347.

A third bearing 343 is also disposed between the steering input shaft 316 and the steering output shaft 317, so it resists radial load between the steering input shaft 316 and the steering output shaft 317. The third bearing 343 may be a needle bearing.

The third bearing 343 supports rotation-directional movement between the steering input shaft 316 and the steering output shaft 317 and resists radial load between the steering input shaft 316 and the steering output shaft 317 when torque is generated between the steering input shaft 316 and the steering output shaft 317 and the torsion bar 319 is twisted.

According to another embodiment of the first steering power assist 310, as shown in FIG. 8, a first steering power assist 310 includes: a reducer 313 including a worm wheel 368 rotatably fitted on the steering output shaft 317 and a worm shaft 369 engaged with the worm wheel 368 to rotate the worm wheel 368 fitted on the steering output shaft 317; and a motor 311 rotating the worm shaft 369 forward or backward in response to steering control signals from the controller 308.

In order that the first steering power assist 310 rotates the steering output shaft 317 using a driving force from the motor 311, the reducer 313 that controls the number of revolutions of the motor 311 for appropriate rotation of the steering output shaft 317 is mounted on the steering output shaft 317.

According to the reducer 313, the worm shaft 369 and the worm wheel 368 are rotated by the driving force from the motor 311 and rotate the steering output shaft 317 while reducing the speed in accordance with a gear ratio.

The steering output shaft 317 is fitted through the center of the worm wheel 368 to rotate together and the worm shaft 369 engaged with the worm wheel 368 is rotated by the driving force from the motor 311 and rotates the worm wheel 368, thereby supplementing steering force of the steering shaft 381 or generating steering force.

The motor 311 rotates the worm shaft 369 forward or backward in response to a steering control signal from the controller 308, thereby supplementing steering force applied to the steering wheel 301 by a driver or rotating the input shaft 329 instead of steering force that is applied to the steering wheel 301 by a driver and operating the second steering power assist 320.

The second steering power assist 320, which is a hydraulic steering power assist having channels that are switched in accordance with the rotational direction an input shaft 329, supplements steering force applied by a driver, depending on the hydraulic pressure of working fluid.

Referring to FIG. 9, the second steering power assist 320, for example, supplements steering force by rotating a sector shaft 351 of a gearbox 325 forward or backward using the hydraulic pressure of working fluid, depending on forward or backward rotation of the input shaft 329.

The second steering power assist 320 is a hydraulic steering power assist using hydraulic pressure from an oil pump 323, in which a screw nut 337 rotates the sector shaft 351 by sliding in one direction or another direction, depending on the hydraulic pressure of working fluid, thereby assisting steering force applied by a driver.

According to the second steering power assist 320, when the input shaft 329 coupled to the steering output shaft 317, a ball screw 335 coupled to the input shaft 329 through a ball screw torsion bar 331 rotates, and the screw nut 337 fitted on the ball screw 335 through balls rotates, thereby rotating the sector shaft 351.

The ball screw 335 has screw grooves on the outer side, the screw nut 337 in which the ball screw 335 is inserted has screw grooves corresponding to the screw grooves of the ball screw 335 on the inner side, and balls are inserted in the screw grooves.

The screw nut 337 has gear teeth 337a on the outer side to drive the sector shaft 351 having gear teeth 351a to engage the gear teeth 337a.

The sector shaft 351 is coupled to a pitman arm 360, so when the sector shaft 351 is rotated, a tie rod or a knuckle is operated by a link coupled to a second end of the pitman arm 360, thereby steering the wheels 309.

When the input shaft 329 is rotated, working fluid flows into the first cylinder 355 or the second cylinder 353 of a gearbox housing 339 through working fluid holes of a valve body 333 surrounding the input shaft 329 and the screw nut 337 is slid in one direction or another direction by the hydraulic pressure of the working fluid, so the torque of the input shaft 329 and the ball screw 335, that is, steering force is supplemented.

Channels for working fluid formed by the working fluid holes of the valve body 333 are switched in accordance with the rotational direction of the input shaft 329, so working fluid flows into the first cylinder 353 or the second cylinder 355 to rotate the sector shaft 351 in correspondence to the rotational direction of the input shaft 329 and the ball screw 335 is rotated by the hydraulic pressure of the working fluid, thereby operating the screw nut 337.

Referring to FIG. 10 showing another embodiment, the second steering power assist 320 supplements steering force by sliding a rack bar 362 forward or backward using the hydraulic pressure of working fluid, depending on forward or backward rotation of the steering shaft 381.

The second steering power assist 320 largely includes a pinion valve assembly 361 connected to the input shaft 329 and a rack bar 362 extending both left and right and connected to wheels 309 to be able to directly operate the wheels 308 when the pinion valve assembly 361 is operated.

The pinion valve assembly 361 connected to an oil pump 323 at a side is disposed on the input shaft 329 and controls oil that is supplied from the oil pump 323.

A pinion (not shown) that is rotated by torque transmitted through the input shaft 329 and has teeth on the outer side of the end is disposed in the pinion valve assembly 361 and a rack housing 363 integrally formed with the pinion valve assembly 361 and extending to both sides is disposed on the outer side of the lower portion of the pinion valve assembly 361.

A cylinder tube 365 is forcibly fitted in a side of the rack housing 363. The cylinder tube 365 is a hollow tube providing a space through which oil supplied through the pinion valve assembly 361 can flow and open at both sides, and oil seals 367 are disposed in both open sides.

The rack bar 362 having a rack gear engaged with the pinion is disposed at a side in the rack housing 363.

The rack bar 362 moves axially in the rack housing 363 and has the rack gear engaged with the pinion. Further, the left and right sides of the rack bar 362 are connected to tie rods through an inner ball joint combined with a ball housing with balls inserted in the ball housing to steer the wheels 309.

A piston 364 that can slide in the cylinder tube 365 in close contact with the inner side of the cylinder tube 365 is disposed at a side of the rack bar 362. The piston 364 is positioned between two hydraulic pipes connected to the pinion valve assembly 361 to be operated by hydraulic pressure supplied through the pinion valve assembly 361.

According to the embodiments having the configurations and structures described above, since the steering apparatus includes an electric steering power assist rotating an input shaft of a hydraulic steering power assist even though a driver does not directly steer, additional functions of controlling a vehicle regardless of driver's intention to steer, such as automatic parking, lane keeping, trailer backup assistance, driving assistance based on road surface condition, steering vibration attenuation, and self-driving control, can be used even in a truck or a bus requiring relatively large steering force in comparison to a car. Accordingly, it is possible to improve convenience for a driver.

Further, according to the embodiments of the present disclosure, it is possible to increase safety for a driver by controlling a vehicle regardless of driver's steering intention, and supplementing or generating steering force in reflection of driver's steering intention when the driver turns a steering wheel, using a torsion bar in an electric steering power assist and a torque sensor that senses the driver's steering intention.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

The above embodiments have been described merely for the purpose of illustrating the technical idea of the present disclosure, and those skilled in the art will appreciate that various modifications and changes are possible without departing from the scope and spirit of the present disclosure. Therefore, the embodiments of the present disclosure are not intended to limit, but to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A steering apparatus for a vehicle, the apparatus comprising:
   a controller configured to transmit steering control signals on the basis of a first input signal from a torque sensor configured to sense torque of a steering shaft and a second input signal from any one of a location sensor, a camera sensor, a distance sensor, a vehicle speed sensor, and a vehicle height sensor, wherein the controller is configured to, when receiving the first input signal and the second input signal simultaneously, transmit the steering control signal in response to the first input signal;
   a first steering power assist configured to generate steering force by rotating the steering shaft or supplement steering force of the steering shaft rotating forward or backward, using electric power in response to the steering control signal from the controller; and
   a second steering power assist configured to switch channels for working fluid, depending on forward or backward rotation of the steering shaft, and steer wheels by operating a tie rod or a knuckle using hydraulic pressure of the working fluid.

2. The apparatus of claim 1, wherein the first steering power assist includes:
a reducer including a worm wheel rotatably fitted on the steering shaft and a worm shaft engaged with the worm wheel to rotate the worm wheel fitted on the steering shaft; and
a motor rotating the worm shaft forward or backward in response to the steering control signals from the controller.

3. The steering apparatus of claim 2, wherein a steering input shaft connected to a column and a steering output shaft connected to the second steering power assist are connected to each other through a torsion bar, in the first steering power assist, and
the torque sensor is disposed on the steering input shaft and the steering output shaft and senses and transmits torque of the steering input shaft and the steering output shaft to the controller.

4. The steering apparatus of claim 1, wherein the second steering power assist supplements steering force by rotating a sector shaft of a gearbox forward or backward using hydraulic pressure of working fluid, depending on forward or backward rotation of the steering shaft.

5. The steering apparatus of claim 1, wherein the second steering power assist supplements steering force by sliding a rack bar forward or backward using hydraulic pressure of working fluid, depending on forward or backward rotation of the steering shaft.

6. A steering apparatus for a vehicle, the apparatus comprising:
a controller configured to transmit steering control signals on the basis of a first input signal from a torque sensor configured to sense torque of a steering shaft and a second input signal from any one of a location sensor, a camera sensor, a distance sensor, a vehicle speed sensor, and a vehicle height sensor;
a first steering power assist configured to generate steering force by rotating the steering shaft or supplement steering force of the steering shaft rotating forward or backward, using electric power in response to the steering control signal from the controller; and
a second steering power assist configured to switch channels for working fluid, depending on forward or backward rotation of the steering shaft, and steer wheels by operating a tie rod or a knuckle using hydraulic pressure of the working fluid,
wherein the first steering power assist includes:
a reducer including a driven pulley rotatably connected to the steering shaft, a belt connected to the driven pulley, and a driving pulley connected to the belt to rotate the driven pulley; and
a motor rotating the driving pulley forward or backward in response to the steering control signals from the controller.

7. The steering apparatus of claim 6, wherein the driving pulley is integrally formed on the outer side of an end of a motor shaft of the motor.

8. The steering apparatus of claim 7, wherein the driving pulley has a pulley gear on the outer side to be engaged with the belt.

9. The steering apparatus of claim 8, wherein locking projections supporting and preventing separation of both ends of the driving pulley are formed at both ends on the inner side of the belt.

10. The steering apparatus of claim 6, wherein a steering input shaft connected to a column and a steering output shaft connected to the second steering power assist are connected to each other through a torsion bar, in the first steering power assist, and
the torque sensor is disposed on the steering input shaft and the steering output shaft and senses and transmits torque of the steering input shaft and the steering output shaft to the controller.

11. The steering apparatus of claim 10, wherein when the first input signal is input to the controller while the first steering power assist and the second steering power assist are operated regardless of driver's steering intention, the controller transmits a steering control signal reflecting priority of driver's steering intention to the motor to operate the first steering power assist and the second steering power assist.

12. The steering apparatus of claim 10, wherein the driven pulley has a pulley gear on the outer side to be engaged with the belt and the steering output shaft is fitted on the inner side the driven pulley to rotate together.

13. The steering apparatus of claim 12, wherein the driven pulley has a coupling portion protruding radially inward to be coupled to the steering output shaft.

14. The steering apparatus of claim 13, wherein a locking projection is formed at a side on the outer side of the steering output shaft and an insertion groove in which the locking portion is inserted is formed at a side on the inner side of the coupling portion.

15. The steering apparatus of claim 13, wherein the driven pulley is integrally formed with the steering output shaft.

16. The steering apparatus of claim 10, further comprising a belt housing configured to receive the belt, the steering output shaft, and the torque sensor therein and combined with the steering output shaft through a first bearing and a second bearing.

17. The steering apparatus of claim 16, further comprising a cover housing coupled to the belt housing by fasteners and coupled to the motor on a side.

18. The steering apparatus of claim 17, wherein a hole is formed through the belt housing to be able to measure tension of the belt and is covered with a detachable plug.

19. The steering apparatus of claim 10, wherein a third bearing is disposed between the steering input shaft and the steering output shaft.

* * * * *